United States Patent [19]

Coffy

[11] Patent Number: 4,755,106
[45] Date of Patent: Jul. 5, 1988

[54] BALANCE-BAR HUB FOR A TWIN BLADE ROTOR

[75] Inventor: René L. Coffy, Sausset-les-Pins, France

[73] Assignee: Aerospatiale Societe Nationale Industrielle, Paris, France

[21] Appl. No.: 931,099

[22] Filed: Nov. 17, 1986

[30] Foreign Application Priority Data

Nov. 21, 1985 [FR] France ................. 85 17229

[51] Int. Cl.[4] .............................................. B64C 27/36
[52] U.S. Cl. ................................ 416/134 A; 416/102; 416/148; 416/140
[58] Field of Search ................... 416/102, 148, 230 A, 416/11, 19, 134 A, 138 A, 140 A, 141, 226, 230 R

[56] References Cited

U.S. PATENT DOCUMENTS

| | | | |
|---|---|---|---|
| 2,949,965 | 8/1960 | De Tore et al. | 416/148 X |
| 3,669,566 | 6/1972 | Bourquardez et al. | 416/148 X |
| 3,790,302 | 2/1974 | Pascher | 416/102 X |
| 3,804,552 | 4/1974 | Covington | 416/148 X |
| 3,807,896 | 4/1974 | Johnson | 416/102 |
| 3,967,918 | 7/1976 | Mouille et al. | 416/102 X |
| 4,222,709 | 9/1980 | Mouille | 416/134 A |
| 4,333,728 | 6/1982 | Drees et al. | 416/140 A X |
| 4,515,525 | 5/1985 | Doman | 416/11 |
| 4,557,666 | 12/1985 | Baskin et al. | 416/11 X |
| 4,621,980 | 11/1986 | Reavely et al. | 416/226 |

FOREIGN PATENT DOCUMENTS

| | | | |
|---|---|---|---|
| 2804386 | 8/1979 | Fed. Rep. of Germany | 416/138 A |
| 3045499 | 6/1982 | Fed. Rep. of Germany | 416/19 |
| 3113080 | 10/1982 | Fed. Rep. of Germany | . |
| 3412592 | 10/1985 | Fed. Rep. of Germany | 416/134 A |
| 2305343 | 10/1976 | France | . |
| 642206 | 7/1962 | Italy | 416/102 |
| 751109 | 6/1956 | United Kingdom | 416/136 |
| 2122156 | 1/1984 | United Kingdom | 416/134 A |

Primary Examiner—Everette A. Powell, Jr.
Attorney, Agent, or Firm—Armstrong, Nikaido, Marmelstein & Kubovcik

[57] ABSTRACT

The invention provides a balance bar twin blade hub. A beam is formed of a tube made from a composite material of evolutive form whose section is cylindrical at its end on the blade side and progressively elliptical as far as its central connection part. It is connected to a support stirrup 2 conical stratified stops 4 forming balance bar bearings identical to the conical stratified stops forming the centrifugal force take up and angle of attack bearings providing the connection between the blade 16 and the beam.

10 Claims, 2 Drawing Sheets

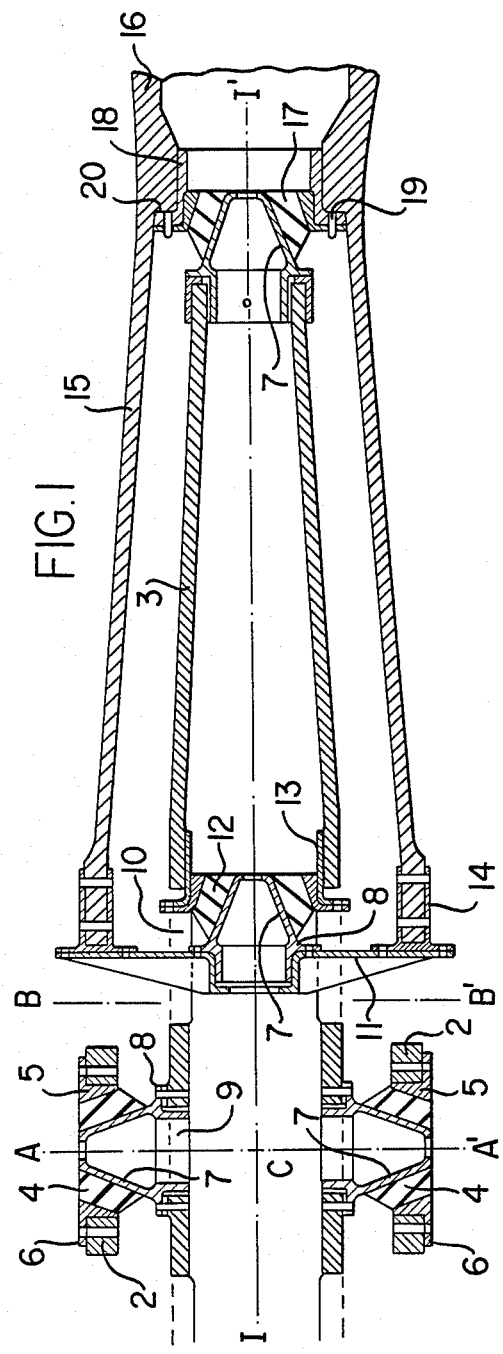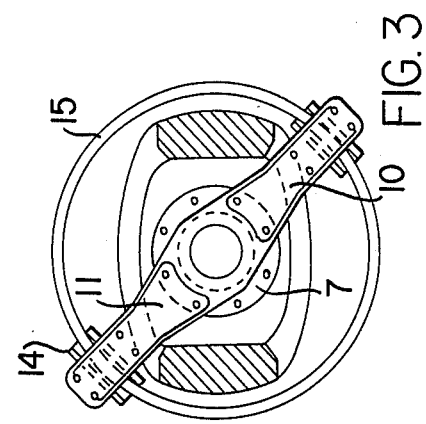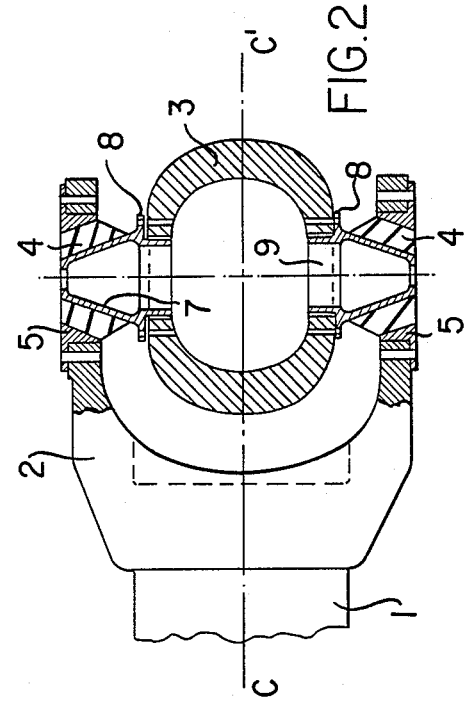

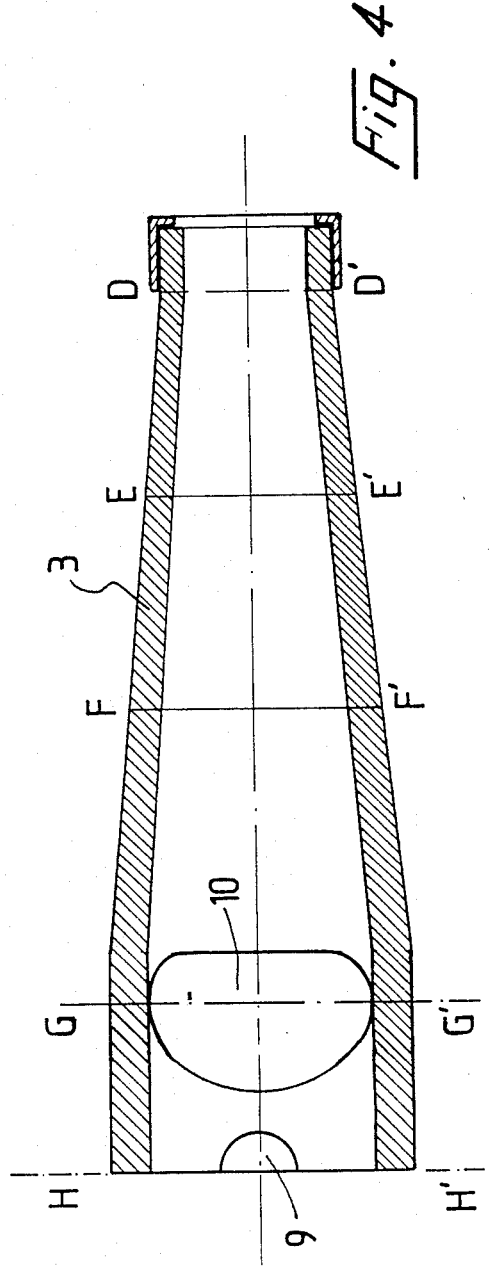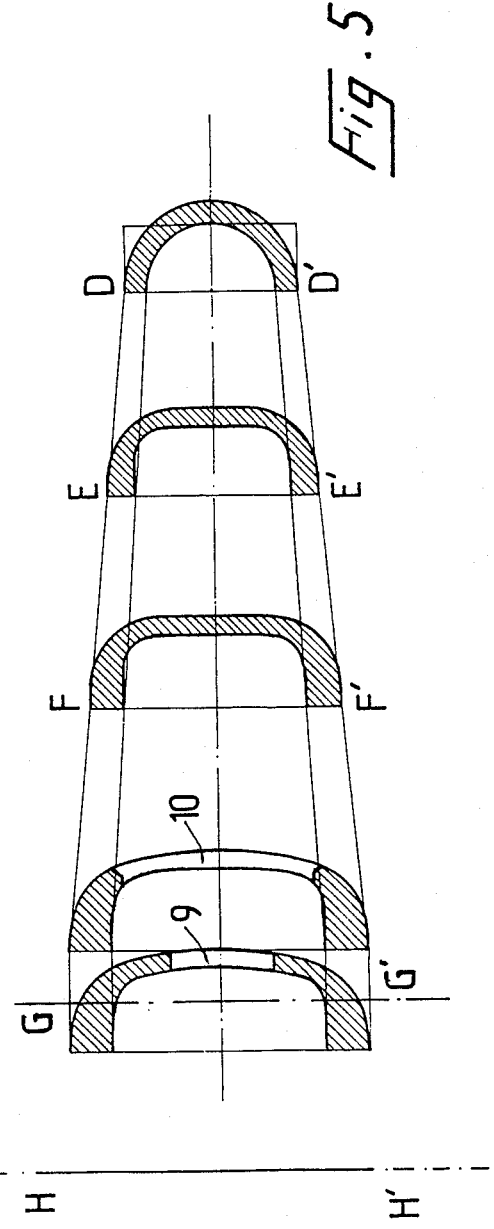

BALANCE-BAR HUB FOR A TWIN BLADE ROTOR

BACKGROUND OF THE INVENTION

1. Field of the Invention

The invention relates to a hub for a twin blade rotor formed as a balance bar for a wind engine, a lift rotor or an anti torque rotor of a helicopter.

The invention relates more precisely to the beam serving as support for the two blades associated with the bearing of the balance bar and for the angle of attack and take up bearings of the centrifugal forces of each blade on the beam. It is known that wind engines use the energy produced by the wind for driving an electric generator or for mechanically driving a motive means for example a pump. The essential member of these wind engines is formed by a rotor in which the number of blades may vary depending on the desired uses. The two bladed rotor is lighter and has found preferable applications in the construction of electric generators of different powers. These rotors must be able to rotate at varying speeds and the angle of attack of the blades with respect to the wind must be adjustable so as to operate with maximum efficiency whatever the speed of the wind. A position must also be provided for feathering the blades should the need arise. All these operating constraints and requirements require robust and reliable equipment, more particularly at the level of the blade support as well as of the hub to which they are fastened. The problem is even more accute when the wind engine is of large size for the centrifugal forces and the bending moments on the blades and on the hub in the case of maximum wind, are extremely high.

2. Description of the Prior Art

This type of large sized wind engine, in order to obtain good efficiency while limiting the weight of the rotor, the rotor of two blade type formed as a balance bar provides an interesting solution. It is known that in this type of rotor each blade is generally supported by a hub body mounted through the universal joint on the rotary shaft so that swinging of one blade with respect to the shaft is compensated by reverse swinging of the other blade and that, in strong gusts, the rotor disk thus assumes a natural balanced position, which appreciably reduces the impaction movements of the hub on the support mast.

The lift rotors and rear anti torque rotors of helicopters are also known of the twin blade type formed as a balance bar whose operating principle is substantially the same as that of the rotor of twin blade wind engine formed as a balance bar. In a particular embodiment of such balance bar rotors, each of the two blades is fixed to the end of the same frame or beam whose central part is gripped in a stirrup itself integral with a rotary shaft forming support mast. Generally, these fixing means between blade and hub must transmit and absorb the centrifugal forces due to the rotation and the bending movements resulting from the aerodynamic forces on the blades. Bearings with metal to metal friction which are currently used wear out rapidly and have insufficient resistance for the above mentioned uses. Furthermore, ball or roller bearings are not suitable either, for despite good oil or grease lubrication they quickly deteriorate through "brinellage" because of the high centrifugal force which acts on them and because they do not rotate but oscillate over the same reduced angular sector.

Other known devices for fixing blades to a hub use instead a support capable of receiving radial thrust elastomer bearings comprising truncated cone shaped layers adhering together with alternately metallic and resilient layers which converge in the direction of the blade. It is known that these types of stratified elastomer bearings are characterized by high flexibility and deformability under shearing forces, as well as by low deformation under compression forces and provide good endurance in service and good operating safety because of the slow and visible progression of damage and by suppressing lubrication results in a very high reduction of the surface maintenance costs.

SUMMARY OF THE INVENTION

To overcome the problems which thus arise in the design of a twin blade rotor formed as balance bar for a wind engine or a helicopter and so as to consequently avoid the above mentioned drawbacks, the invention provides a new hub for a balance bar twin blade rotor in which centrifugal and flexion forces on the blades are transmitted to the hub through a tubular beam of special design with a new arrangement of the stratified elastomer bearings associated therewith for fixing the blades and for articulating the balance bar.

According to a main characteristic of the invention, the beam is a tube of evolutive form whose section is cylindrical at its end on the blade side and is progressively elliptical as far as its central part for connection to the hub.

With such a structure a great rigidity is conferred under the beam under flexion and twisting forces and the control of the pitch of the blades can be ensured, including in the case of the wind engine for feathering thereof in a safeguard position by varying the pitch through about 90°.

According to another characteristic of the invention, the beam of evolutive form is connected to its support stirrup by stratified elastomer bearings of a geometry identical to the stratified elastomer bearings for the angle of attack and for taking up the centrifugal forces which, on the one hand, ensure the connection between the beam and the blade and on the pitch control.

BRIEF DESCRIPTION OF THE DRAWINGS

Other special features and advantages of the invention will be clear from the following description of one embodiment given by way of non limitative example with reference to the accompanying drawings which show:

FIG. 1—a partial sectional view of a wind engine rotor two blade hub of the invention, FIG. 2—a view along AA' of FIG. 1;

FIG. 3—a side view along BB' of FIG. 1;

FIG. 4—a partial schematical view in cross section of the beam through the axis 11' of FIG. 1; and FIG. 5—a view showing different sections of the beam along the lines DD' and HH' of FIG. 4.

DESCRIPTION OF THE PREFERRED EMBODIMENTS

In FIGS. 1 to 3 is shown the structure of a twin blade hub with horizontal rotational axis. (Case of the wind engine and of the rear antitorque rotor of a helicopter).

Shaft 1 of the rotor visible in FIG. 2 is rotatable about axis CC' and is integral with a stirrup 2 which supports beam 3 through two balance bar stops 4. The tube is made from a composite material whose shape is variable between each of its ends and its central part at the level of the balance bar stops 4.

Each of these stops has, between an external frame 5 and an internal frame 7, a plurality of truncated cone shaped metal cups between which are disposed layers of elastomer rubber bonded to the cups and to the frames.

The external frame 5 bears on the fork joint of the stirrup 2 and is fixed thereto by a circular flange 6.

The internal frame 7 has an open cylindrical base and is provided with a circular shoulder 8.

Beam 3 is pierced centrally, perpendicularly to the rotational axis of the hub, with two facing openings 9 in which is placed the cylindrical base of frame 7. The circular shoulder 8 thereof then bears on the outer face of the beam. Bores provided in these shoulders allow the frame 7 to be fixed to the beam by a ring of bolts. Two other facing openings 10 are also provided in beam 3 on each side of the central hub. They allow the passage of a pitch control and socket fitting 11 connected to the beam by a stratified elastomer angle of attack stop taking up the centrifugal forces. This stratified elastomer stop also has a truncated cone shape and its internal frame forms a connecting fitting 7 of the same shape and same dimension as the frame supporting the balance bar bearing 4.

Shoulder 8 of this connecting fitting 7 comes to bear against the socket and pitch control fitting 11 and the bores with which it is provided allow these parts to be fixed together by bolting. The external frame of stop 12 is in abutment against and bolted to a sleeve 13 engaged inside beam 3 and firmly secured thereto.

At both ends of the socket fitting 11 are fixed brackets 14 in which the end of a sleeve 15 is firmly held which is an integral part of blade 16 of which it forms the extension. This sleeve 15 of a substantially cylindrical shape envelopes the beam 3. The blade at the level of the end of the sleeve bears on the end of beam 3 through a stratified elastomer stop forming an angle of attack bearing 17.

The internal frame of this stop forms a connecting fitting 7 also of the same type as that previously described whose base is fitted into the end of the beam. A socket 18 centered on this part bears on the external frame of stop 17.

Socket 18 bears on sleeve 15 through a shoulder 20. Centering is provided through positioning pins 19 at the level of shoulder 20 which prevent the rotation of the two parts.

FIG. 5 shows different sections of beam 3 along the lines DD' to HH' of FIG. 4. From a circular section at the right hand end of the Figures (line DD') to the level of the connection with the blade via the stop 17, the beam has a progressively evolutive section as far as the section GG'; from the section HH' as far as the equivalent section on the other side of the hub body, the elliptical section remains constant. It includes two opposite openings 10 of a substantially ovoidal shape for passing the socket and control fitting 11 therethrough as well as two circular bores in the section HH' for housing and supporting the frames 5 of the stratified stops forming the articulation of the balance bar.

This new beam design confers thereon a great rigidity and thus, in the case of the wind machine, limits the amount of flexion at the end of the blades. It also provides for the passage of members for feathering the blades in a safeguard position by rotation through 90° of their pitch angle.

The beam is formed by winding, which allows automated manufacture. It may also be formed by draping, but such manufacture is more complex because of the number of fabrics to be cut out, to be draped and to be compacted. The material used is advantageously composite materials such as glass impregnated with epoxy resin. For the wound solution, impregnation of the glass threads may be carried out on site, on the other hand for the draped solution it will be preferable to use preimpregnated glass fabrics of high weight. Holes 9 and 10 are machined after hot polymerization of the beam.

The arrangement such as described allows stratified elastomer stops to be used of identical geometry which in particular have the same external frames, whether at the level of the balance bar bearings 4 or of the root and angle of attack bearings 17, which represents a very substanital reduction of the development cost. Considering the conical shape, said bearings absorb without important damage the high axial and radial forces which are applied thereto, while still providing a range of rotation of more than 90° without requiring exaggeratedly high control forces. It will be noted that the configuration of the beam allows the root and angle of attack bearings 12 and 17 to be housed therein.

What is claimed is:

1. A hub for a rotor of the twin blade type formed as a balance bar including, a support mast having, at one of its ends, a bifurcated stirrup, a beam articulated, intermediate its ends, perpendicular to the axis of said support mask and intermediate the legs of said bifurcated stirrup on bearings articulating said beam between said stirrup legs, each of said beam ends extending outwardly from said stirrup having, articulated thereon and extending axially of said beam, a blade on each of said beam ends, said blade on each of said outwardly extending beam ends being retained on said beam against centrifugal force by spaced bearings, said beam being tubular and of circular cross-section at its opposite ends and evoluting inwardly, toward said stirrups, into an elliptical cross-section of constant shape intermediate the ends of said blades and between said sitrrup legs, said bearing articulating said beam between said stirrups legs and said spaced bearing retaining said blade one each of said extending beam ends being conical stratified elastomer stops of substantially identical shape.

2. The twin blade hub as claimed in claim 1, wherein said tubular beam evolving inwardly has a cylindrical section at the blade end is progressively elliptical towards a central zone.

3. The twin blade hub as claimed in claim 1, wherein said conical stratified elastomer stops each have an internal frame with an outer truncated cone shape whose cylindrical base is open and has a circular shoulder and an external frame comprising, at its base, a circular bearing and fixing flange.

4. The twin blade hub as claimed in claim 3, wherein said beam is pierced in its middle perpendicularly to the axis of rotation of said hub with two circular facing bores, in each of which bores is positioned and fixed, by means of a ring of bolts, the cylindrical base of the internal frame of each of said conical stratified elastomer stops and the external frame of said stops is fixed in the corresponding bores of said stirrup by said circular bearing and fixing flange.

5. The twin balde hub as claimed in claim 1, wherein said conical stratified elastomer stop has an external frame and a circular flange having a sleeve engaged insider of said beam.

6. The twin blade hub as claimed in claim 1, wherein a root and control fitting is fixed to the end of a sleeve in the extension of said blade on the same side of said blade as the center of the beam.

7. The twin blade hub as claimed in claim 1, wherein a conical stratified elastomer stop provides a connection between one end of said beam and the end of a sleeve at the begining of the blade.

8. The twin blade hub as claimed in claim 7, wherein the external frame of said conical stratified elastomer stop bears with its circular flange on a socket centered on a resistant structure of said blade and is made integral therewith.

9. The twin blade hub as claimed in claim 8, wherein positioning pins at the level of the shoulder of the socket engaged in corresponding bores formed in the circular flange of the internal frame of the conical stratified elastomer stop allow said frame to be driven in rotation by the resistant structure of said blade and said socket.

10. The twin blade hub as claimed in claim 1, wherein said beam is made from a composite material of high resistance fibers bonded by means of a synthetic resin by winding elementary fibers or ribbons or by draping fabric layers on a removable mandrel.

* * * * *